United States Patent
Li (10) Patent No.: US 6,636,556 B2
(45) Date of Patent: *Oct. 21, 2003

(54) LARGE AREA WIRELESS CDMA SYSTEM AND METHOD

(75) Inventor: Daoben Li, Beijing (CN)

(73) Assignee: LinkAir Communications, Inc., San Jose, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 09/867,558

(22) Filed: May 31, 2001

(65) Prior Publication Data

US 2002/0009124 A1 Jan. 24, 2002

Related U.S. Application Data

(63) Continuation-in-part of application No. 09/501,666, filed on Feb. 10, 2000, now Pat. No. 6,331,997.

(51) Int. Cl.[7] .......................... H04B 15/00; H04K 1/00; H04L 27/30
(52) U.S. Cl. .................................................... 375/146
(58) Field of Search ............................... 375/130, 146, 375/342, 140

(56) References Cited

U.S. PATENT DOCUMENTS

| | | | | |
|---|---|---|---|---|
| 3,795,864 A | * | 3/1974 | Fullton, Jr. | 708/410 |
| 4,058,713 A | * | 11/1977 | DiToro | 708/305 |
| 4,330,862 A | * | 5/1982 | Smolik | 375/316 |
| 5,511,099 A | * | 4/1996 | Ko et al. | 375/368 |
| 5,596,601 A | | 1/1997 | Bar-David | |
| 5,610,907 A | | 3/1997 | Barrett | |
| 5,623,511 A | * | 4/1997 | Bar-David et al. | 375/207 |
| 5,712,871 A | | 1/1998 | Chang | |
| 5,778,022 A | * | 7/1998 | Walley | 375/206 |
| 5,790,591 A | * | 8/1998 | Gold et al. | 375/206 |
| 6,115,411 A | | 9/2000 | Van Driest | |
| 6,331,997 B1 | * | 12/2001 | Li | 375/130 |
| 6,452,958 B1 | * | 9/2002 | van Nee | 375/130 |

* cited by examiner

Primary Examiner—Jean B. Corrielus
(74) Attorney, Agent, or Firm—David Newman Chrtd.

(57) ABSTRACT

A transmitter and a receiver using a set of Large-Area Code-Division-Multiple-Access (LA-CDMA) codes. The LA-CDMA codes are generated from a plurality of pulses, and a plurality of codewords. The plurality of pulses has a plurality of intervals between each of the pulses. Each pulse has an amplitude and a polarity. Each interval is unequal to other intervals of the plurality of intervals. Only one interval is an odd number larger than a value of a smallest interval of the plurality of intervals. No value of any interval is a sum of any two or more values of two or more intervals, respectively, in the plurality of intervals. Each codeword is different from other codewords in the plurality of codewords. The plurality of codewords are either orthogonal, or bi-orthogonal, or trans-orthogonal.

12 Claims, 7 Drawing Sheets

LARGE AREA WIRELESS CDMA SYSTEM AND METHOD

RELATED PATENTS

This patent stems from a continuation-in-part patent application of U.S. patent application Ser. No. 09/501,666, filed Feb. 10, 2000, now U.S. Pat. No. 6,331,1997 entitled A SCHEME FOR SPREAD-SPECTRUM MULTIPLE ACCESS CODING, which stemmed from Patent Cooperation Treaty (POT) patent application no. PCT/CN98/00151, now U.S. Pat. No. 6,331,997 of the parent U.S. patent application and PCT patent application are claimed for common subject matter pursuant to 33 U.S.C. §§119, 120 and 365.

BACKGROUND OF THE INVENTION

This invention relates to spread-spectrum communications, and more particularly to a coding technique for a large area spread-spectrum CDMA system.

DESCRIPTION OF THE RELEVANT ART

The growing popularity of personal communication services coupled with the scarcity of radio bandwidth resources has resulted in the ever-increasing demand for higher spectral efficiency in wireless communications. Spectral efficiency refers to the maximum number of subscribers that can be supported in a cell or sector under a given bandwidth allocation and transmission rate requirement. The unit of spectral efficiency is the total transmission rate per unit bandwidth within a given cell or sector. Obviously, the better the spectral efficiency is, the higher the system capacity will be.

Traditional wireless Multiple Access Control (MAC) systems, such as a Frequency Division Multiple Access (FDMA) system, a Time Division Multiple Access (TDMA) system, result in system capacity that is limited by the time-bandwidth (TB) product. It is impossible to increase the number of supportable subscribers under these MAC schemes. For example, assume that the basic transmission rate of a subscriber is 1/T samples per second and the allocated bandwidth is B Hz. Then, the time-bandwidth product is BT, which is the maximum number of supportable subscribers. It is impossible to support more than BT subscribers in FDMA and TDMA systems.

The situation is completely different under a Code Division Multiple Access (CDMA) system where the system capacity only depends on the Signal-to-Interference Ratio (SIR). Increasing the number of subscriber reduces the SIR, thus lowering the transmission rate. However, a subscriber will not be denied radio resource allocation. In other words, unlike FDMA and TDMA systems, a CDMA system does not have a hard upper bound (i.e. BT) on the number of supportable subscribers.

The capacity of a CDMA system depends on the interference level. As such, the ability to accurately control the interference level is critical to the performance and the successful operation of a CDMA system. There are four sources of interference in a CDMA system: The first type of interference, or noise, comes from various sources in the local environment, which cannot be control by the wireless communication system. The only way to alleviate noise interference is to use a low noise amplifier. The second type of interference is Inter-Symbol-Interference (ISI). The third type of interference is Multiple Access Interference (MAI) that is originated from other subscribers in the same cell. The forth type of interference is Adjacent Channel or Cell Interference (ACI) that is originated from other subscribers in the neighboring channel or cell. It is possible to reduce or eliminate ISI, MAI, and ACI by using high performance codes.

In a CDMA system, each subscriber has his/her own unique identification code. In addition, the subscribers' spread-spectrum codes are orthogonal to each other. The orthogonality requirement is common to all multiple access schemes. If the communication channel is an ideal linear time and frequency non-dispersion system, and the system has high degree of synchronization, then the subscribers will stay orthogonal to each other. In reality, the communication channel is not ideal, and it is very difficult to achieve tight synchronization for communication channels with time and frequency dispersion. As a result, the ability to achieve orthogonality in a non-ideal communication channel with time and frequency dispersion is critical to the successful operation of CDMA systems.

It is commonly known that a mobile communication channel is a typical random time varying channel, with random frequency dispersion, due to Doppler shift effect, and random time dispersion, due to multi-path transmission effect. Random frequency dispersion results in the degradation in time selectivity of the received signal with unexpected fluctuation of the reception power level. Random time dispersion results in the degradation in frequency selectivity, which results in the unexpected variation in the reception level within each frequency component. This degradation results in reduced system performance and significantly lowers the system capacity. In particular, because of the time dispersion of the transmission channel, as a result of multi-path transmission, different signal paths do not arrive at the receiver at the same time. This results in the overlapping of neighboring symbols of the same subscriber and causes Inter Symbol Interference (ISI). On the other hand, the time dispersion of the channel worsens the multiple access interference. When the relative delay of signals of different subscribers are zero, any orthogonal code can achieve orthogonality. However, it is very hard to maintain orthogonality if the relative delay of signals of subscribers is not zero.

In order to reduce ISI, the auto-correlation of each subscriber's access codes must be an ideal impulse function that has all energy at the origin, nowhere else. To reduce the MAI, the cross-correlations between multiple access codes of different subscribers must be zero for any relative delay. In the terms of orthogonality, each access code must be orthogonal to itself with non-zero time delay. The access codes must be orthogonal to each other for any relative delay, including zero delay.

For simplicity, the value of an auto-correlation function at the origin is called the main lobe and the values of auto-correlations and cross-correlations at other points are called side lobes. The correlation functions of ideal multiple access codes should have zero side lobes everywhere. Unfortunately, it is proved in Welch theory that there does not exist any ideal multiple access codes in the field of finite elements and even in field of complex numbers. The claim that ideal multiple access codes do not exist, is called the Welch bound. Especially, the side lobes of auto-correlation function and the side lobes of cross-correlation function are contradicted to each other; as side lobes of one correlation function become small, the side lobes of the other correlation function become big. Furthermore, NASA had done brute force searching, by using a computer, to search for all ideal codes. However, there has not been a breakthrough.

Since then, not much research work has been done on the search of the ideal multiple codes.

NASA searched for the good access codes in the Group codes and the Welch bound in the sub-fields of complex numbers. Beyond the field of complex numbers, the ideal codes could exist. For example, B. P. Schweitzer found an approach to form ideal codes in his Ph.D thesis on "Generalized complementary code sets" in 1971. Later, Leppanen and Pentti (Nokia Telecommunication) extended Dr. Schweitser's results in the mixed TDMA and CDMA system. They broke the Welch bound in the high dimensional space. However, the utilization of frequency is very low and thus there is no practical value. There has not been any application of their invention in nearly 30 years. According to their invention, in a system of N multiple access codes, there requires at least $N^2$ basic codes. Each basic code has length at least N chips. That means it needs $N^3$ chips to support N addresses. For example, when N=128, with 16 QAM modulation, the coded spectral efficiency is only $\log_2 16 \times 128/128^3 = 2.441 \times 10^{-4}$ bits/Hz. The more access codes, the lower the utilization of the spectral efficiency. This coding methodology reminds us that ideal multiple access codes can be achieved via complementary code sets. We should, however, avoid that the code length grows too fast with the required number of multiple access codes.

In addition, with technique of two-way synchronization, the relative time delay within each access code or between each other in a random time varying channel will not be greater than the maximum time dispersion of the channel plus the maximum timing error. Assuming that value is $\Delta$ second, so long as their correlation functions do not have any side lobes in a time interval $(-\Delta, \Delta)$, there are no MAI and ISI between the access codes. The time interval that possesses the above property is called "zero correlation window". It is obvious that the corresponding CDMA system will be ideal when the "zero correlation window" size is wider than the maximum time dispersion deviation of the channel, i.e. the time delays among multi-paths of the signal, plus the maximum timing error. At the same time, it is also true that the near-far effects are no longer effective. The well-known near-far effects is created by the overlapping of the side lobe of a signal source that is close to the base station receiver and the main lobe of a signal source that is far away from the base station receiver. The side lobe over-kills the main lobe, which causes high interference. The accurate, complicated and fast power control mechanism has to been used to overcome the near-far effects so that the energy of signals must be basically the same at the base station receiver. However, within the "zero correlation window" of the multiple access codes, there are no side lobes in the auto-correlation functions and cross-correlation functions under the working condition. The near-far effects no longer exist in the system. The complicated and fast power control mechanism will become less important and optional.

Therefore, the distinction between different CDMA systems lies mainly in the selected multiple access codes, i.e. in a good system, ISI and MAI must both be small, otherwise they must be larger.

Existing CDMA systems have either very low efficiency or have very short communications distance for example about several hundred meters or do nothing to MAI and ISI and then all that can be done is to alleviate them by using relatively good multiple access codes.

SUMMARY OF THE INVENTION

A general object of the invention is a CDMA spread-spectrum system for a large area synchronous communications system or a large area asynchronous communications system.

An object of the present invention is to provide a new coding method for use with a spread-spectrum transmitter and receiver to create a series of spread-spectrum multiple access codes that have the "Zero Correlation Window" in their auto-correlation functions and cross-correlation functions. Due to the creation of the "zero correlation window", the fatal near-far effects in traditional CDMA radio communications is solved. The Multiple Access Interference (MAI) and the Inter-Symbol Interference (ISI) is eliminated. A high RF capacity radio system could be thus created based on the invention.

According to the present invention, as embodied and broadly described herein, a transmitter and a receiver are provided which use a set of Large-Area Code-Division-Multiple-Access (LA-CDMA) codes. The LA-CDMA codes are generated from the steps of generating a plurality of pluses, and generating a plurality of codewords.

The plurality of pluses has a plurality of intervals between each of the pulses in the plurality of pulses, respectively. Each pulse of the plurality of pulses has an amplitude and a polarity. Each interval of the plurality of intervals is unequal to other intervals of the plurality of intervals. Only one interval of the plurality of intervals is an odd number larger than a value of a smallest interval of the plurality of intervals. No value of any interval in the plurality of intervals is a sum of any two or more values of two or more intervals, respectively, in the plurality of intervals.

Each codeword in the plurality of codewords is different from other codewords in the plurality of codewords, by assigning, for each respective codeword in the plurality of codewords, a polarity to each pulse in the plurality of pulses. The plurality of codewords are either orthogonal, or bi-orthogonal, or trans-orthogonal. The codewords are generated such that a cross-correlation between any two codewords in the plurality of codewords has side-lobes with any of the values of zero, plus amplitude squared, and minus amplitude squared. Any codeword in the plurality of codewords has a zero correlation window in an auto-correlation function and the cross-correlation function with a magnitude equal to the amplitude squared and with a width equal to two times the smallest interval of the plurality of intervals.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings, wherein like reference numerals indicate like elements throughout the several views.

The present invention provides a new, simpler, clearer and faster design scheme of spread-spectrum multiple access codes. Based on the scheme, both MAI and ISI in the corresponding CDMA system can be controlled and thus a digital wireless communications system with large capacity can be constructed.

Ideal spread-spectrum multiple access codes should satisfy the two main conditions: First, each code's auto-correlation function should be an ideal impulse function, i.e. the function should be zero everywhere except at the origin. From the view of orthogonality, each code should be orthogonal to its own relative time delay version unless the relative time delay is zero. Second, the cross-correlation function between any two codes should be zero everywhere. From the view of orthogonality, each code should be orthogonal to all the other codes with any relative time delay, including the zero delay.

To elaborate, the auto-correlation values at the origin are denoted as the main-lobe value, while the auto-correlation values not at the origin, as well as the cross-correlation values, are denoted as side-lobe values. For an ideal CDMA system, the side-lobe values of all the auto-correlations and cross-correlations should be zero. For a practical system, however, it is impossible to satisfy that condition. In this case, all that can be done is to try to make the values of the side-lobe values as small as possible, or the main-lobe value to side-lobe value ratio as large as possible, and the number of the side-lobe values as few as possible. As for binary codes, the smallest non-zero side-lobe value must be +1 or −1.

Therefore, in some embodiments of the present invention a spread-spectrum multiple access coding scheme controls and reduces the side-lobe values of the auto-correlations and cross-correlations.

In addition, a random access asynchronous communications system in which all the user stations' clocks are not controlled by a base station is desirable because of its simplicity. That system, on the other hand, has a very strict requirement on the spread-spectrum multiple access codes, characteristic. So, some embodiments of the present invention give an effective and practical method for such a random access asynchronous digital communications system.

The spread-spectrum multiple access codes have basic pulses with normalized "1" amplitude and width and different polarities. The number of the basic pulses is determined according to such practical factors as the number of required users, the number of available pulse compressing codes, the number of available orthogonal pulse compressing codes, the number of available orthogonal frequencies, system bandwidth, the system's highest transmission rate, etc. The intervals between the basic pulses on the time axis are all unequal and the basic pulse positions on it are all different, which are both considered together with the basic pulses, polarities when coding.

Of all the values of the basic pulses' intervals mentioned above, only one is an odd number larger than the smallest interval's value, i.e. the coding length is odd, while the other interval values are all even. Moreover, any interval's value can not be the sum of any other two or more interval values.

According to orthogonality, the spread-spectrum multiple access codes mentioned above are sorted into different code groups, in which the polarities of the basic pulses are determined by the orthogonality requirement and the sequence is sorted according to Hadamard or other orthogonal matrices, or some kind of bi-orthogonal or trans-orthogonal matrix.

The above coding method is a new CDMA spread-spectrum multiple access coding scheme for a Large Area Asynchronous Wireless Communications System or Large Area Synchronous Wireless Communications System, and the code groups are named LA-CDMA codes. When doing correlation, whether it is auto-correlation or cross-correlation, and whether it is periodic correlation, or non-periodic correlation, or even mixed correlation, no two or more basic pulses can meet together besides at the origin, which ensures that the side-lobes, values are at most +1 or −1. Furthermore, there exists a zero correlation window beside the origin and the main-lobe's value equals the number of basic pulses. Therefore, the side-lobes of the auto-correlations and cross-correlations are controlled and reduced. That is, in the corresponding CDMA system, both MAI and ISI are controlled, and an ideal CDMA system without MAI and ISI can also be realized if the zero correlation window were utilized.

The above principles lead to a new simpler, clearer and faster design scheme of spread-spectrum multiple access codes for spread-spectrum technology and digital multiple access technology. Based on the scheme, a CDMA system's design can be simplified and large capacity achieved, so as to solve the contradiction between the growing need for high capacity and the limited frequency resources.

Because the side-lobes of the correlations are small and smooth, MAI and ISI are unrelated to the users, access time and thus random access is permitted. Further, so long as the stability of the clocks in the user stations, transceivers, meets a specific requirement, an asynchronous mode is also permitted.

In a practical design, to increase the code's duty ratio, the above mentioned basic pulse also can be formed by pulse compressing codes, which include one or more binary or m-ary sequences, including frequency modulated sequences, or frequency and phase jointly modulated sequences, or frequency, phase and time jointly modulated sequences, etc.

In order to raise the transmission data rate or reduce frequency band-width, or increase the number of multiple access codes number, the codes can also be time offset and overlapped, where the shift interval should be larger than the channel's maximum time dispersion, the maximum multi-path time delay difference. In the case that the shift interval is smaller than the channel's maximum time dispersion, the shifted version should be modulated by different orthogonal frequencies.

In order to raise the code's duty ratio and transmission data rate simultaneously as much as possible, both of the above methods can be combined, i.e. the basic pulse includes pulse compressing codes, including one or more binary or m-ary sequences, or frequency modulated sequences, or frequency and phase jointly modulated sequences, or frequency, phase and time jointly modulated sequences, etc. At the same time, the codes are time offset and overlapped.

To further increase the number of multiple access codes, the above mentioned basic pulse can also be formed by orthogonal pulse compressing codes, including one or more binary or m-ary sequences, or frequency modulated sequences, or frequency and phase jointly modulated sequences, or frequency, phase and time jointly modulated sequences, etc, or the above mentioned basic pulses can be modulated by different orthogonal frequencies.

Figure 1:
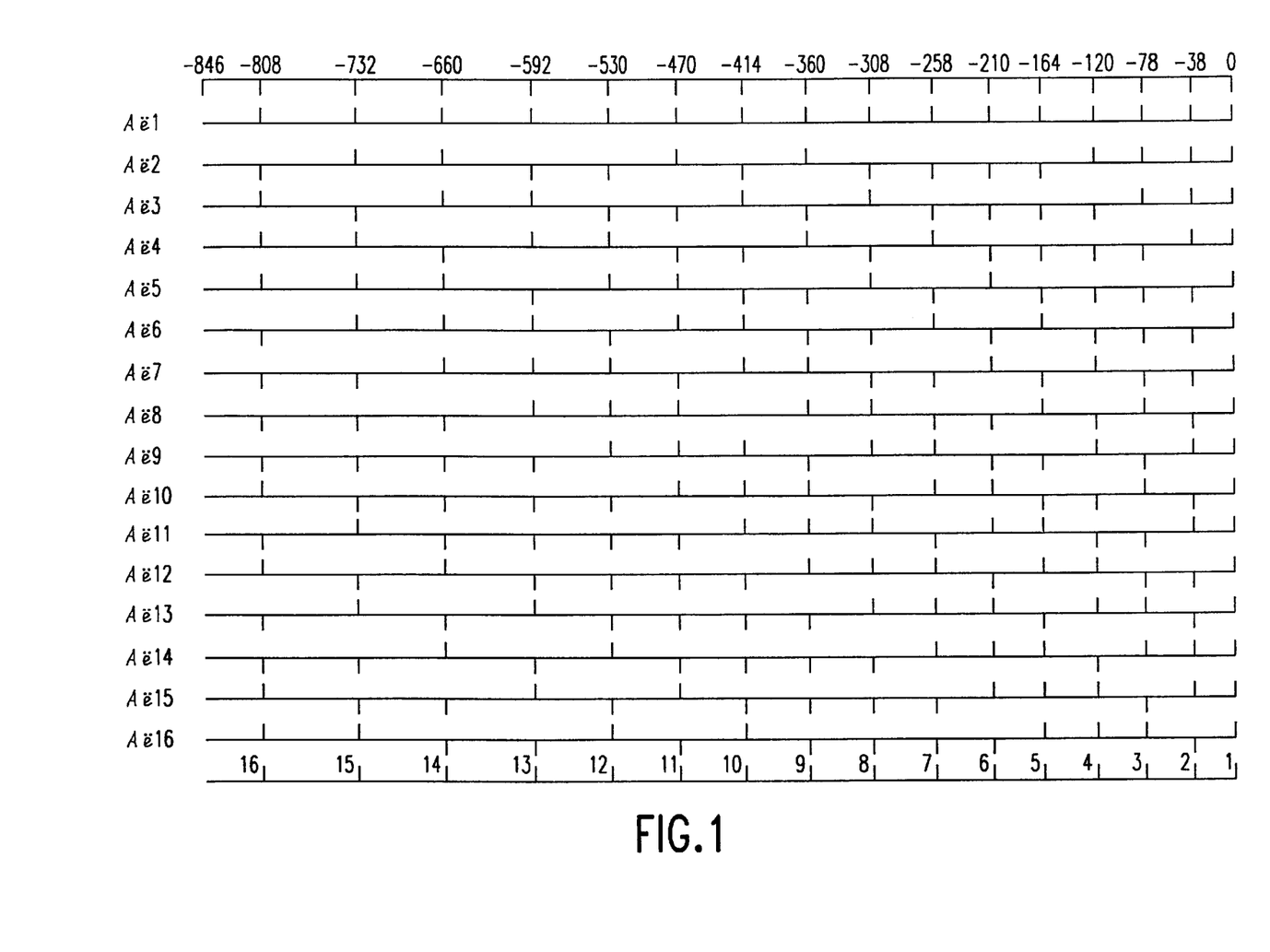
FIG. 1 illustrates an example of LA-CDMA code groups, with 16 codes.

FIG. 1 is a simple LA-CDMA orthogonal code group including 16 access code words that can be used by 16 users simultaneously. Each code word consists of 16 "±" basic pulses. The period of this code group is 847. The intervals between pulses are respectively: 38, 40, 42, 44, 46, 48, 50, 52, 54, 56, 60, 62, 68, 72, 76 and 39. The polarities of the pulses ensure orthogonality between the codes.

Figure 2:
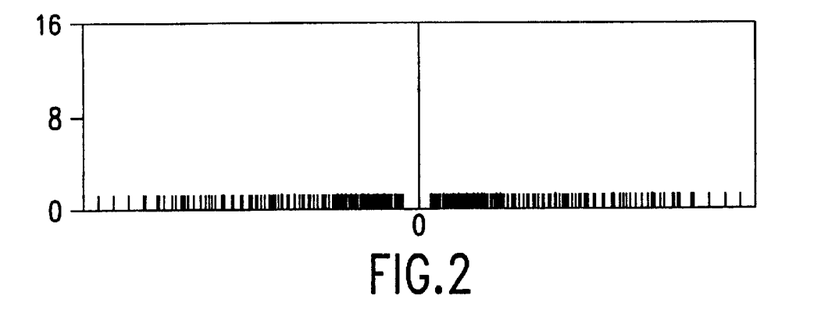
FIG. 2 is an illustration of the non-periodic auto-correlation function for code 1 in FIG. 1.
Figure 3:
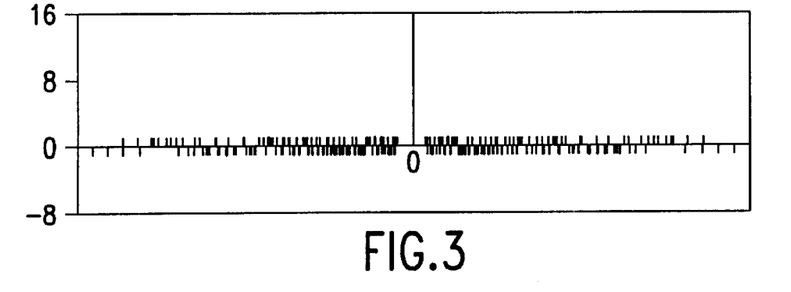
FIG. 3 is an illustration of the non-periodic auto-correlation function for code 2 in FIG. 1.
Figure 4:
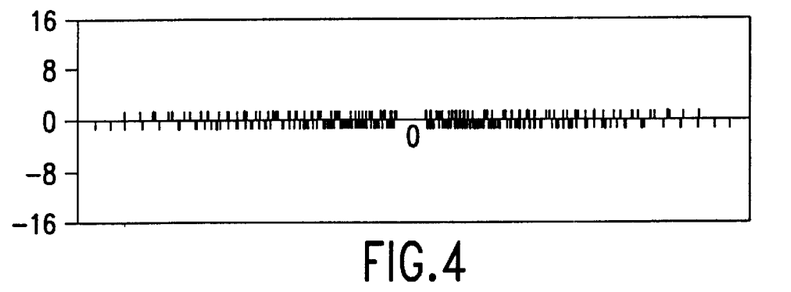
FIG. 4 is an illustration of the non-periodic cross-correlation function for code 1 and code 2 in FIG. 1.
Figure 5:
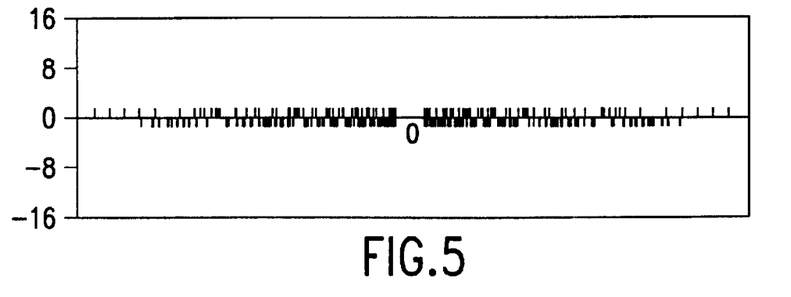
FIG. 5 is an illustration of the non-periodic cross-correlation function for code 3 and code 4 of FIG. 1.

FIG. 2 and FIG. 3 are non-cyclic auto-correlation curves for code 1 and code 2 in FIG. 1, respectively. As shown in FIGS. 4 and 5, cross-correlation functions between other pairs of codes have quite similar shapes so that side lobes may equal a value chosen from +1, −1 or 0. FIG. 4 is an illustration of the non-periodic cross-correlation function for code 1 and code 2 in FIG. 1. FIG. 5. is an illustration of the non-periodic cross-correlation function for code 3 and code 4 of FIG. 1.

The correlation functions of any other LA-CDMA codes have quite similar shapes, and the difference lies in polarities and positions of side lobes. The features of this code are described as follows:

1) Main lobe value of auto-correlation function equals the number of basic pulses, and also equals the number of orthogonal code words in the code group.

2) There are only three possible values of side lobes in the auto-correlation and cross-correlation function: +1, −1 or 0.

3) A zero correlation window in the auto-correlation and cross-correlation function or around the origin exists, and its magnitude is equal to plus two times of the minimal interval between basic pulses.

The LA-CDMA code group that is designed according to this invention can control, and in some embodiments minimize, the side-lobe valuess of the auto-correlation and cross-correlation function. This enables the CDMA system to control and minimize MAI and ISI, simultaneously.

Table 1 and Table 2 respectively list minimum periods of LA-CDMA codes of 16 basic pulses and 32 basic pulses under the conditions of various minimal basic pulse intervals, in order to make it convenient for selecting such periods.

TABLE 1

Periods and Minimum Intervals of 16-Pulse LA-CDMA Codes

| MINIMUM INTERVAL | MINIMUM PERIOD | MINIMUM INTERVAL | MINIMUM INTERVAL | MINIMUM INTERVAL | MINIMUM PERIOD | MINIMUM INTERVAL | MINIMUM PERIOD |
|---|---|---|---|---|---|---|---|
| 38 | 847 | 40 | 897 | 42 | 905 | 44 | 923 |
| 46 | 959 | 48 | 995 | 50 | 1065 | 52 | 1049 |
| 54 | 1081 | 56 | 1117 | 58 | 1145 | 60 | 1179 |
| 62 | 1213 | 64 | 1247 | 66 | 1269 | 68 | 1303 |
| 70 | 1337 | 72 | 1379 | 74 | 1395 | 76 | 1427 |
| 78 | 1461 | 80 | 1495 | 82 | 1529 | 84 | 1563 |
| 86 | 1587 | 88 | 1619 | 90 | 1653 | 92 | 1683 |
| 94 | 1715 | 96 | 1749 | 98 | 1783 | 100 | 1811 |
| 102 | 1843 | 104 | 1875 | 106 | 1907 | 108 | 1939 |
| 110 | 1971 | 112 | 2003 | 114 | 2035 | 116 | 2067 |
| 118 | 2099 | 120 | 2131 | 122 | 2163 | 124 | 2195 |
| 126 | 2227 | 128 | 2259 | 130 | 2291 | 132 | 2323 |
| 134 | 2355 | 136 | 2387 | 138 | 2419 | 140 | 2451 |
| 142 | 2483 | 144 | 2515 | 146 | 2547 | 148 | 2579 |
| 150 | 2611 | 152 | 2643 | 154 | 2675 | 156 | 2707 |
| 158 | 2739 | 160 | 2771 | 162 | 2803 | 164 | 2835 |
| 166 | 2867 | 168 | 2899 | 170 | 2931 | 172 | 2963 |
| 174 | 2995 | 176 | 3027 | 178 | 3059 | 180 | 3091 |
| 182 | 3123 | 184 | 3155 | 186 | 3187 | 188 | 3219 |
| 190 | 3251 | 192 | 3283 | 194 | 3315 | 196 | 3347 |
| 198 | 3379 | 200 | 3411 | 202 | 3443 | 204 | 3475 |
| 206 | 3507 | 208 | 3539 | 210 | 3571 | 212 | 3603 |
| 214 | 3635 | 216 | 3667 | 218 | 3699 | 220 | 3731 |
| 222 | 3763 | 224 | 3795 | 226 | 3827 | 228 | 3859 |
| 230 | 3891 | 232 | 3923 | 234 | 3955 | 236 | 3987 |
| 238 | 4019 | 240 | 4051 | 242 | 4083 | 244 | 4115 |
| 246 | 4147 | 248 | 4179 | 250 | 4211 | 252 | 4243 |
| 254 | 4275 | 256 | 4307 | | | | |

TABLE 2

Periods and Minimum Intervals of 32-Pulse LA-CDMA Codes

| MINIMUM INTERVAL | MINIMUM PERIOD | MINIMUM INTERVAL | MINIMUM PERIOD | MINIMUM INTERVAL | MINIMUM PERIOD | MINIMUM INTERVAL | MINIMUM PERIOD |
|---|---|---|---|---|---|---|---|
| 32 | 4751 | 34 | 4465 | 36 | 4447 | 38 | 4489 |
| 40 | 4745 | 42 | 4847 | 44 | 4889 | 46 | 5359 |
| 48 | 4699 | 50 | 5225 | 52 | 5125 | 54 | 5117 |
| 56 | 5315 | 58 | 4725 | 60 | 4687 | 62 | 4765 |
| 64 | 4423 | 66 | 5115 | 68 | 5059 | 70 | 5307 |
| 72 | 5299 | 74 | 5617 | 76 | 4955 | 78 | 5133 |
| 80 | 4915 | 82 | 5397 | 84 | 5499 | 86 | 4965 |
| 88 | 5291 | 90 | 5223 | 92 | 4837 | 94 | 5539 |
| 96 | 5889 | 98 | 5373 | 100 | 5319 | 102 | 5051 |
| 104 | 5331 | 106 | 5617 | 108 | 5991 | 110 | 5109 |
| 112 | 5347 | 114 | 5383 | 116 | 5127 | 118 | 4883 |
| 120 | 5211 | 122 | 5429 | 124 | 5737 | 126 | 5663 |
| 128 | 5725 | 130 | 5623 | 132 | 5725 | 134 | 5497 |
| 136 | 5323 | 138 | 5393 | 140 | 5465 | 142 | 5811 |
| 144 | 5959 | 146 | 5893 | 148 | 6331 | 150 | 6355 |
| 152 | 5943 | 154 | 6053 | 156 | 6075 | 158 | 6241 |
| 160 | 6425 | 162 | 6475 | 164 | 6267 | 166 | 6399 |
| 168 | 6517 | 170 | 6435 | 172 | 6491 | 174 | 6555 |
| 176 | 6631 | 178 | 6665 | 180 | 6751 | 182 | 6835 |
| 184 | 6839 | 186 | 6903 | 188 | 6971 | 190 | 7059 |
| 192 | 7121 | 194 | 7295 | 196 | 7521 | 198 | 7351 |
| 200 | 7543 | 202 | 7427 | 204 | 7521 | 206 | 7579 |
| 208 | 7629 | 210 | 7689 | 212 | 7739 | 214 | 7807 |
| 216 | 7875 | 218 | 7953 | 220 | 8031 | 222 | 8051 |
| 224 | 8119 | 226 | 8173 | 228 | 8239 | 230 | 8307 |
| 232 | 8375 | 234 | 8443 | 236 | 8499 | 238 | 8569 |
| 240 | 8641 | 242 | 8743 | 244 | 8747 | 246 | 8813 |
| 248 | 8881 | 250 | 8949 | 252 | 9011 | 254 | 9113 |
| 256 | 9173 | | | | | | |

Pulse duty ratio for basic the LA-CDMA code is very low. For example, FIG. 1 shows that pulse duty ratio of a 16 basic pulse code with period of 847 is merely 16/847 (=0.0189). To increase the duty ratio in a practical design, pulse compression codes with good performance, such as a Barker sequence or linear frequency modulation code, can be substituted for each single pulse in the basic code. In this way, so long as the received signal passes through a matched filter matched to this pulse compression code, then the output is the required LA-CDMA code. Several solutions for increasing pulse duty ratio included in this invention are described below.

Figure 6:
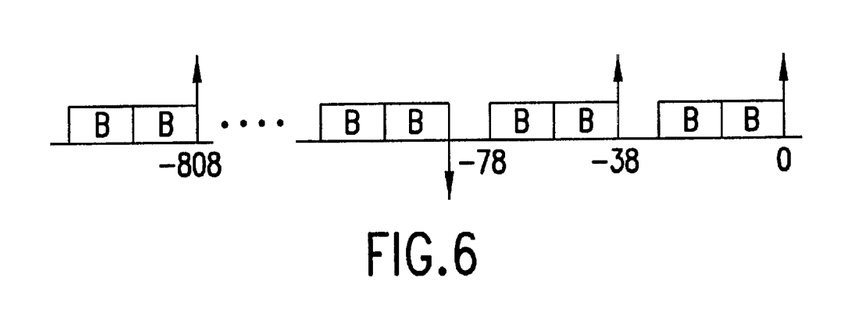
FIG. 6 shows the LA-CDMA codes formed by the relative coding pulse compressing method.

Forming an LA-CDMA code by a relative encoding pulse compression method is shown in FIG. 6. A positive pulse in the basic LA-CDMA code is generated by two consecutive pulse compression code "B"s with the same polarity, whereas a negative pulse is generated by a positive and a negative pulse compression code "B". For instance, considering a 16-pulse LA-CDMA code with a period of 847. If a 13-hit Barker sequence were chosen for the pulse compression code, then the duty ratio of the code rises to 16×26/847 (=0.4911).

Figure 7:
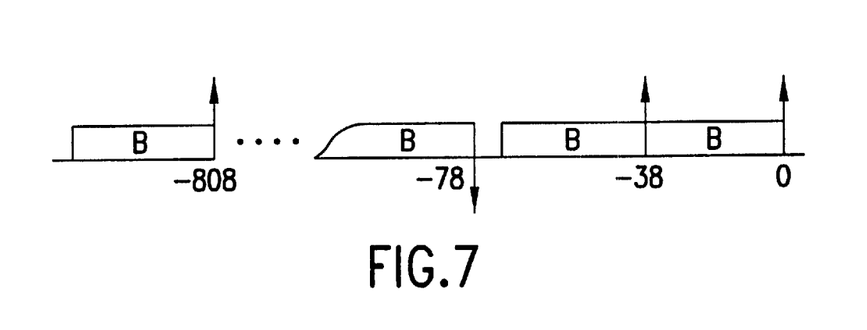
FIG. 7 shows the LA-CDMA codes formed by the absolute coding pulse compressing method.

Forming an LA-CDMA code by an absolute encoding pulse compression method is shown in FIG. 7. A positive pulse in the basic LA-CDMA code is generated by a pulse compression code "B", whereas a negative pulse is generated by an inverse, i.e. an inverted polarity "B", of the pulse compression code. For instance, still considering a 16-pulse LA-CDMA code with a period of 847, if a 28-bit pulse compression code were chosen to form a single pulse, then the duty ratio rises to 16×28/847 (=0.5289); if a 38-bit pulse compression code were chosen to form a single pulse, then the duty ratio rises to 16×38/847 (=0.7178).

Figure 8:
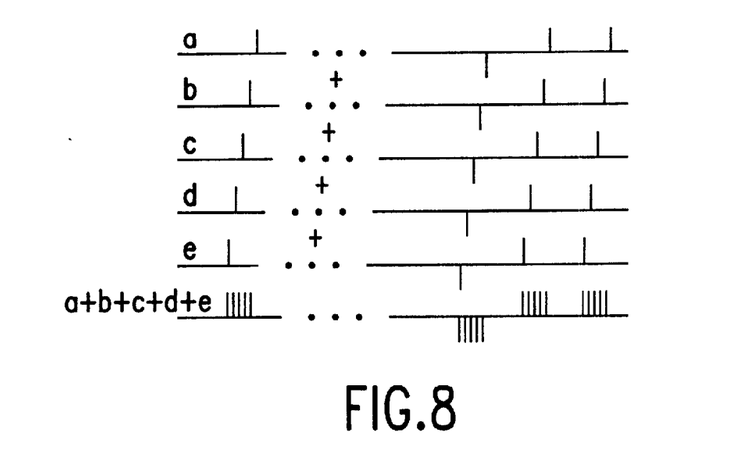
FIG. 8 shows the time offsetting and overlapping method to raise the code's duty ratio.

Adopting a time-offset overlapped method for increasing the duty ratio is illustrated in FIG. 8, where "a" is the primitive code, "b", "c", "d" and "e" are shifted code versions after four shifts, respectively, and "a+b+c+d+e", is a time-offset overlapped code. It should be noted that the time-offset value must be greater than the time dispersion range of the channel; otherwise, either adding a partial response equalizer to the receiver in order to reduce time dispersion range of channel, or adopting various orthogonal frequencies for the time-offset versions smaller than the time dispersion range of the channel, should be employed. When synchronization techniques are adopted, it is similar to a TDMA technique in that different shift versions can be used by different users. Therefore, this can increase the number of orthogonal codes greatly. In a random access system, each shifted version of the LA-CDMA code can only be used by one user, but that method can increase the user's data rate enormously without expanding system bandwidth, or can decrease system bandwidth while retaining a given data rate.

Clearly, the time-offset overlapped pulse compression method can also be employed, which is a mixture the relative encoding compression method of FIG. 6, and the time-offset overlapped method of FIG. 8, or a mixture of the absolute encoding compression method of FIG. 7 and the time-offset overlapped method of FIG. 8. The time-offset overlapped method can provide the greatest increase in pulse duty ratio and information rate simultaneously, or decrease system bandwidth with data rate unaffected.

Sometimes it is inconvenient that the maximum number of users offered by the basic LA-CDMA code is determined only by the quantity of basic pulses, since the more orthogonal codes in the code group, the better. Embodiments of this invention may provide three solutions to enlarge the number of users.

The first solution is to adopt orthogonal pulse compression codes. If M pieces of orthogonal pulse compression codes can be found, then M×N orthogonal pulse compression code words can be obtained when there are N pulses in an LA-CDMA code. For example, considering a 16-pulse LA-CDMA code with a period of 847 and choosing a 32-bit orthogonal code as its pulse compression code, as there are 32 orthogonal codes in the 32-bit orthogonal pulse compression code group, there are a total of 16×32 (=512) orthogonal code words.

The second solution is to adopt orthogonal frequencies. The simplest implementation is to utilize a general purpose FDMA/CDMA mixed technique. In this way, if M kinds of orthogonal frequencies were employed, in which intervals of frequencies are multiples of I/T, here T is the duration of a pulse in the LA-CDMA code, then M×N orthogonal code words can be obtained when there are N pulses in the LA-CDMA code. By introducing different orthogonal frequencies to different pulses in the LA-CDMA code, especially when the pulse compression method is employed, then the finally acquired code is a compound code of the basic LA-CDMA code and the chosen pulse compression code. According to compound encoding theory, the property of a compound code is mainly determined by the code with worse performance of two elements of the compound code. Thus, when a pulse compression code is chosen poorly, the final properties of the auto-correlation function and cross-correlation function will worsen. When every pulse is "isolated" by orthogonal frequencies, the pulse compression code will be "isolated" too, minimizing degradation accordingly and increasing room for choices greatly. For instance, still considering a 16-pulse LA-CDMA code with a period of 847, when 16 orthogonal frequencies are introduced and a 32-bit orthogonal code serves as the pulse compression code, a total of 16×16×32 (=8192) orthogonal code words are obtained.

The third solution is to relax the restriction of orthogonality, i.e. to adopt quasi-orthogonality which uses imperfect orthogonal codes, to increase the number of users. For example, considering an LA-CDMA code with N pulses, as the order of N basic intervals has no affect on its auto-correlation function and cross-correlation function, the order of N basic intervals can be arbitrary. When a code group with various orders of basic intervals is exploited at the same time, the number of users will increase enormously. This also can serve as a solution for reducing interference of adjacent service areas or channels.

CDMA Transmitter With LA-CDMA Codes

Figure 9:
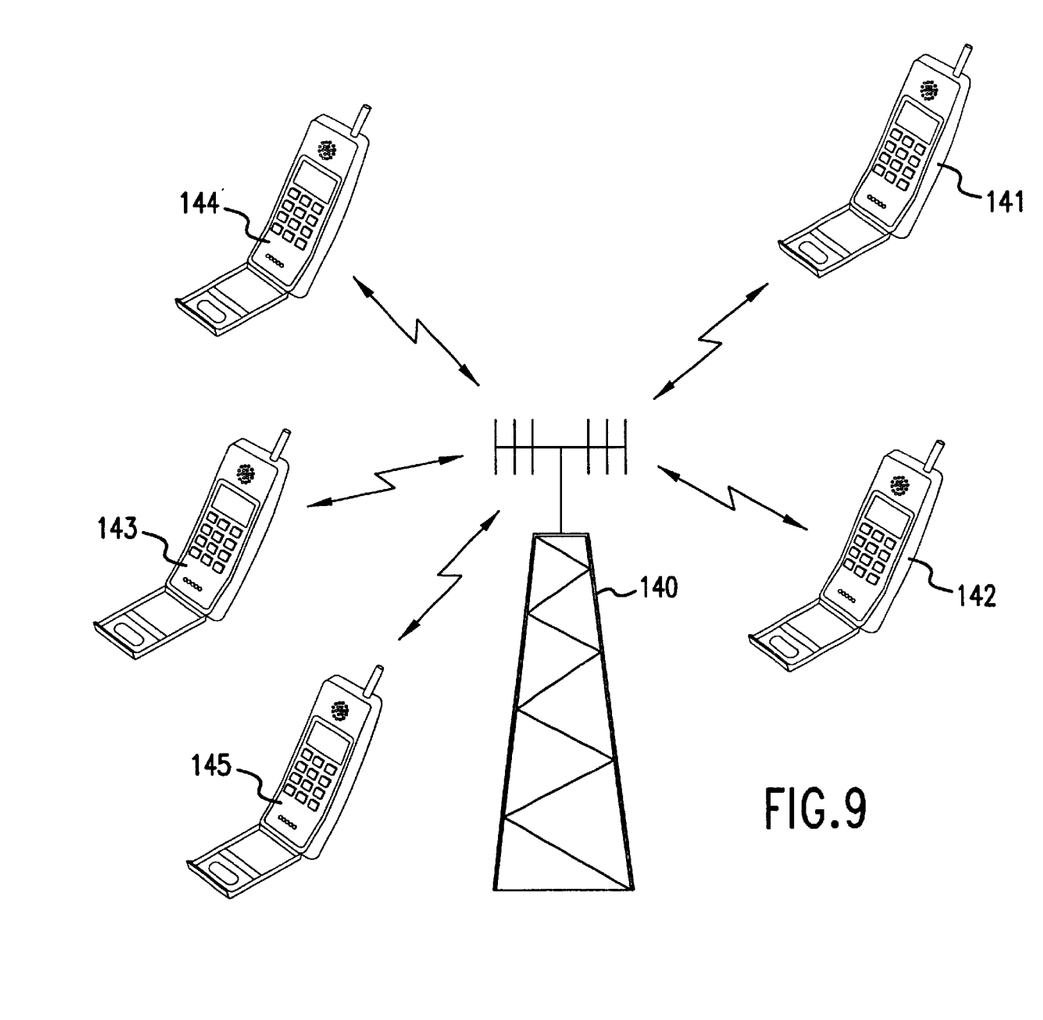
FIG. 9 illustrates a base station communicating with several remote stations.

FIG. 9 shows a base station 140 communicating with a plurality of remote stations 141, 142, 143, 144, 145. The base station 140 and each of the plurality of remote stations 141, 142, 143, 144, 145 have a CDMA transmitter and a CDMA receiver, or equivalently, a CDMA transceiver, using the LA-CDMA codes.

Figure 10:
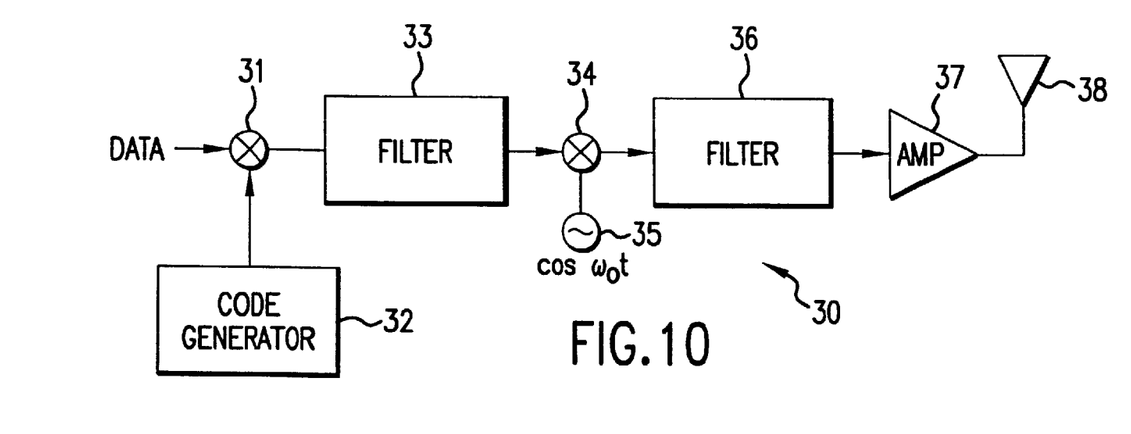
FIG. 10 is a block diagram of a spread-spectrum transmitter with a code generator.
Figure 11:
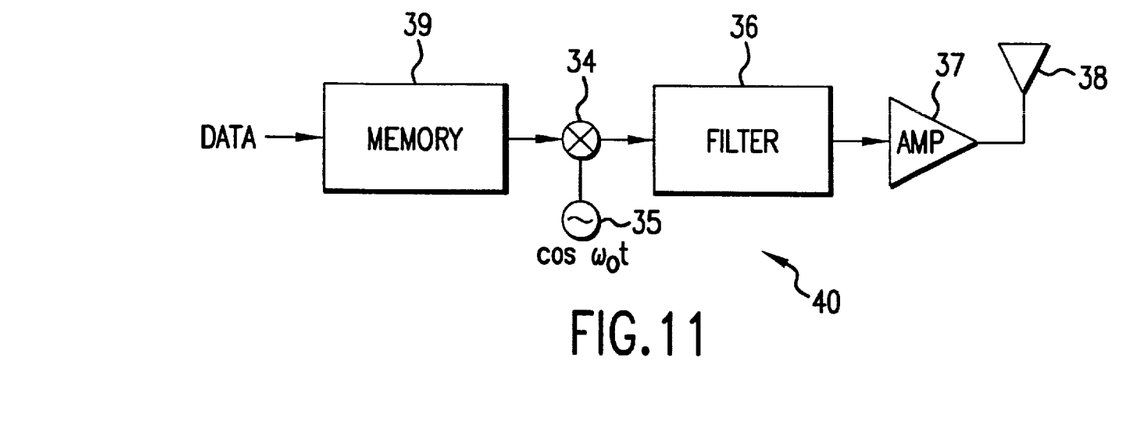
FIG. 11 is a block diagram of a spread-spectrum transmitter with a memory.

The CDMA codes having a zero correlation window may be used in a spread-spectrum transmitter. In the exemplary arrangement shown in FIGS. 10 and 11, representative spread-spectrum transmitters 30, 40 are shown. Data from a data source are processed by transmitter-code means, to generate a spread-spreactrum-processed signal. The transmitter-code means spread-spectrum processes the data with a particular large area code-division-multiple-access (LA-CDMA) code from a plurality of LA-CDMA codes. The plurality of LA-CDMA codes have the zero correlation window with a respective auto-correlation function. The zero correlation window has a value of zero except at an origin. A particular LA-CDMA code of the plurality of LA-CDMA codes has a cross-correlation function with other LA-CDMA codes in the plurality of LA-CDMA codes, within the zero correlation window. The cross-correlation function has a value of zero everywhere inside the zero correlation window.

The spread-spectrum-processed signal is raised to a carrier frequency by product device 34, to generate a spread-spectrum signal with carrier signal $\cos(\omega_o t)$ at a carrier frequency $f_o$. The carrier signal $\cos(\omega_o t)$ at the carrier frequency $f_o$ is from signal source 35. The output from the product device 34 is filtered by filter 36. Filter 36 typically is a bandpass filter, with a bandwidth centered at the carrier frequency $f_o$ and a bandwidth sufficiently wide to pass the spread-spectrum signal. The spread-spectrum signal is amplified by amplifier 37 and radiated by antenna 38.

In FIG. 10, the transmitter-code means to generate the spread-spectrum-processed signal, includes a code generator 32, product device 31 and filter 33. The product device 32 is connected or coupled to the code generator 32 and between the data source and filter 33. The code generator 32 generates the particular LA-CDMA code from the plurality of LA-CDMA codes, and any of the other LA-CDMA code in the plurality of LA-CDMA codes. The product device 31 spread-spectrum processes the data with the particular CDMA code. The filter 33 filters the spread-spectrum-processed signal.

In FIG. 11, the transmitter-code means to generate the spread-spectrum processed signal, includes a memory 39. The memory 39 may be a disk, RAM, or other memory. Memory devices and medium are well known in the art. The data includes symbols. In a simple form, the symbols are 1-bits and 0-bits. Multiple bit symbols, however, may is included. In response to a particular symbol of a plurality of symbols from the data source, the memory 39 outputs the particular LA-CDMA code from the plurality of LA-CDMA codes stored in the memory 39. The mapping of symbols to LA-CDMA codes preferably is one-to-one.

The spread-spectrum transmitters 30, 40 of FIGS. 10 and 11, respectively, are representative, and as is well-known in the art, may be embodied with more or additional features and technology. The present invention can be used with more advanced spread-spectrum transmitters than those depicted in FIGS. 10 and 11.

Spread-Spectrum Receiver With LA-CDMA Codes

Figure 12:
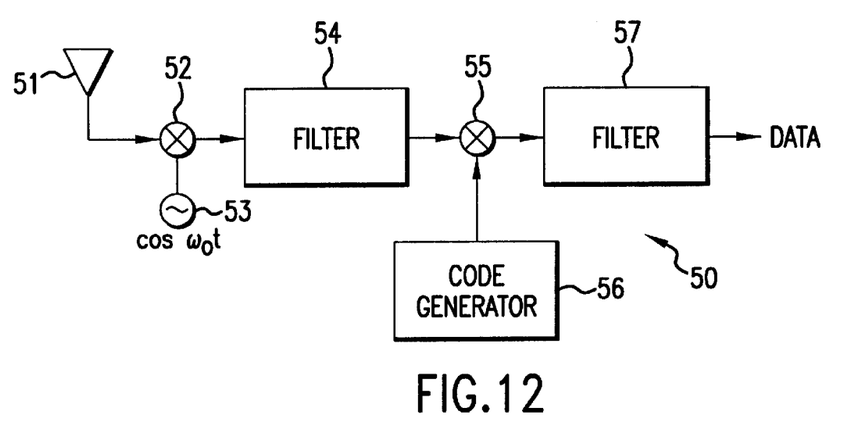
FIG. 12 is a block diagram of a spread-spectrum receiver with a product detector.
Figure 13:
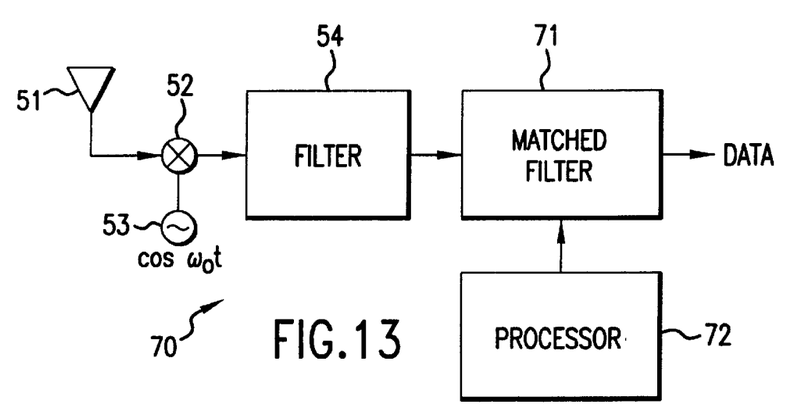
FIG. 13 is a block diagram of a spread-spectrum receiver with a matched filter.

The exemplary drawings of FIGS. 12 and 13 show two embodiments of spread-spectrum receivers 50, 70 which may be used to receive a spread-spectrum signal having the particular CDMA code with the zero correlation window. The received spread-spectrum signal was transmitted by a spread-spectrum transmitter using the particular LA-CDMA code with the zero correlation window. The typical spread-spectrum source is an antenna 51, but other sources my be used, such as a cable, or other communications channel. Typically a signal source 53 generates the carrier signal $\cos(\omega_o t)$ at a carrier frequency $f_o$. A mixer 52 mixes the spread-spectrum signal with the carrier signal $\cos(\omega_o t)$ at a carrier frequency $f_o$, for baseband processing. Other frequencies, such as an intermediate frequency, may be used for processing the spread-spectrum signal. The filter 54 filters the spread-spectrum signal at the processing frequency. Such technology is well-known in the art.

The receiver-code means spread-spectrum processes the spread-spectrum signal with a replica of the particular LA-CDMA code from the plurality of LA-CDMA codes. The replica of the particular CDMA code has a zero correlation window, and an auto-correlation function, within the zero correlation window, having a value of zero except at an origin. The replica of the particular LA-CDMA code has a cross-correlation function with other LA-CDMA codes in the plurality of LA-CDMA codes, within the zero correlation window, having a value of zero everywhere inside the zero correlation window.

In FIG. 12, the receiver-code means is embodied as a receiver-code generator 56 a mixer 55 and as filter 57. The mixer 55 is coupled between the filter 54 and the filter 57, and to the code generator 56. The receiver-code generator 56 generates the replica of the particular LA-CDMA code from the plurality of LA-CDMA codes. The mixer 55 spread-spectrum processes the spread-spectrum signal at the processing frequency with the replica of the particular LA-CDMA code. The filter 57 filters the processed spread-spectrum signal, to output data.

The receiver-code generator 56 generates the replica of the particular CDMA code with the zero correlation window, and an auto-correlation function, within the zero correlation window, having a value of zero except at an origin. The replica of the particular LA-CDMA code has a cross-correlation function with other LA-CDMA codes in the plurality of LA-CDMA codes, within the zero correlation window, having a value of zero everywhere inside the zero correlation window. The receiver-code generator 56 may include a memory for storing the replica of particular LA-CDMA code, or the entire plurality of replicas of LA-CDMA codes. Other signal generating techniques, including switching and logic circuitry, are well-known in the art, may be used for generating one or all of the LA-CDMA codes.

In FIG. 13, the received-code means is embodied as a matched filter 71. The matched filter has an impulse response, matched to the particular CDMA code of the spread-spectrum signal being received by the spread-spectrum receiver 70. Preferably, the matched filter 71 is a programmable matched filter, which, by control of processor 72, can change the impulse function of the matched filter 71. The matched filter 71 may include a two-stage, or multi-stage matched filter, depending on systems requirements and design criteria. The matched filter 71 may be a surface-acoustic-wave (SAW) device. In response to detecting the particular CDMA code embedded in the received spread-spectrum signal, the matched filter 71 outputs the particular symbol of the plurality of symbols. The particular symbol typically might be the 1-bit and the 0-bit.

Figure 14:
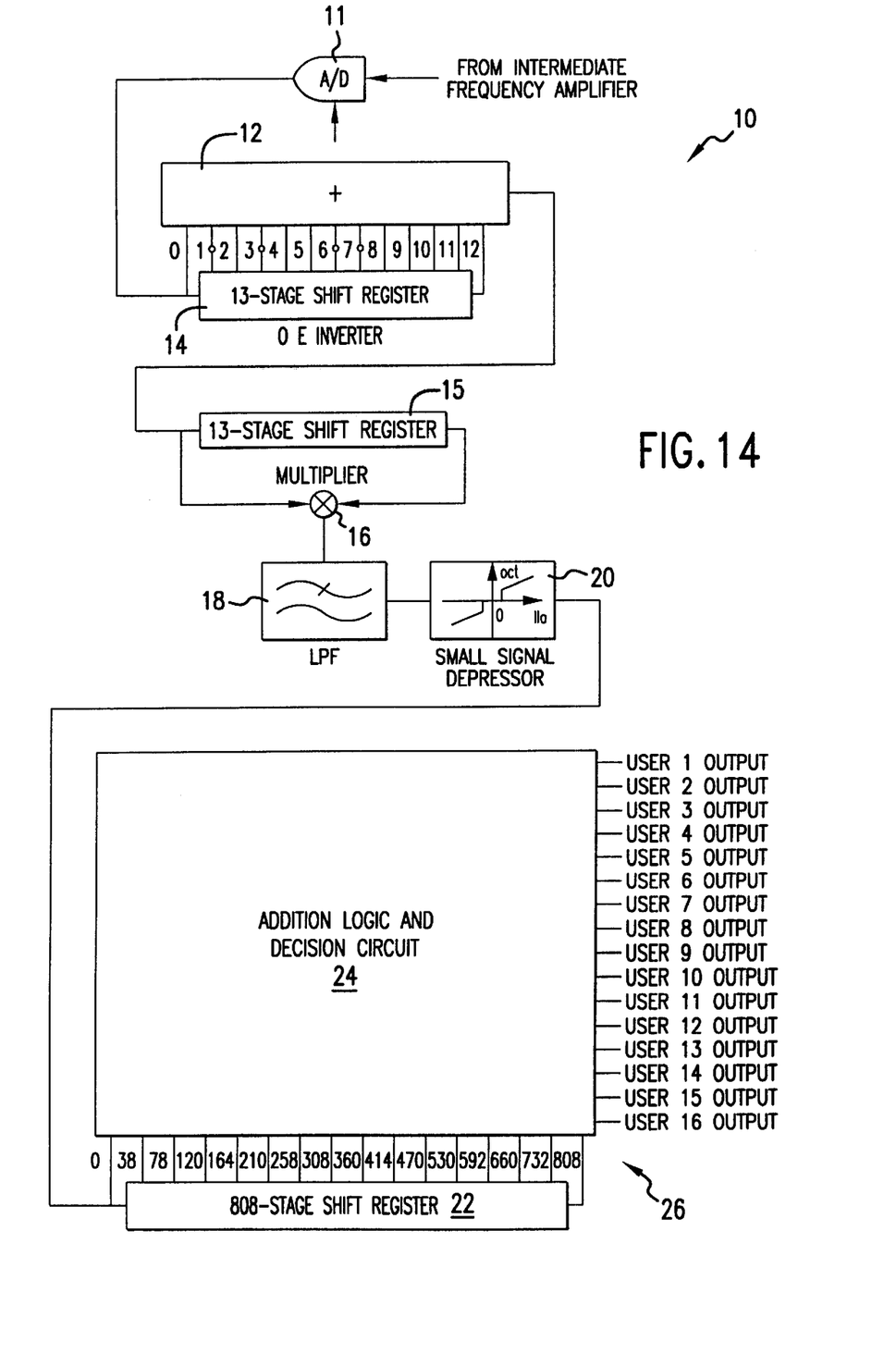
FIG. 14 shows a diagram of a class receiver.

FIG. 14 is a block diagram of a receiver 10 for a LA-CDMA random access code division multiple access wireless system exploiting one embodiment of this invention. This system adopts 16-pulse LA-CDMA codes and 4 orthogonal frequencies, and can accommodate 64 users signaling simultaneously. The basic structures of a transmitter and a receiver may be readily ascertained once the information basic formula and modulation mode are decided. Detailed implementations may entail some modification according to practical situations. For example, a receiver can be realized either by a matched filter or by a correlator. They both implement correlation operations, and essentially have no distinction. In these cases, a transmitter must generate the required modulated waveforms that can be demodulated by computation. Generally, the receiver's structure is comparatively simple, such that a wireless telecommunication engineer can design it in the light of basic modulated signal waveform.

The 16-pulse LA-CDMA code with a period of 847 shown in FIG. 1 is adopted as a multiple access code in this system. Moreover, it utilizes 4 orthogonal frequencies, and each frequency's interval is the reciprocal of the basic pulse's duration. A relative coding pulse compression method is employed to generate the basic LA-CDMA code, with modulation performed using binary phase-shift keying ("BPSK"), and with a pulse compression code of a 13-bit Barker sequence, which is 1 1 1 1 1 −1 −1 1 1 −1 1 −1 1 1.

Users are permitted to transmit using random access, and to receive by a matched filter. FIG. 13 depicts a receiver's block diagram for a certain orthogonal frequency. An analog signal from an intermediate frequency amplifier is converted to a digital signal by an analog to digital converter 11. The system 10 detects a 13-bit Barker sequence using a pulse shape matched filter 12 that includes a 13-bit digital tap delay line 14, multipliers 16 with a 13-bit stage shift register 15, a low pass filter 18 and a weak signal detector or small signal depressor 20. An 808-bit digital tap delay line 22 and an additional logic circuit 24, which is another part of the receiver, form a pulse position matched filter 26.

The pulse shape matched filter 26 forms pulses of the basic LA-CDMA code, while the pulse position matched filter implements a match operation an the LA-CDMA code. A pulse position matched filter can implement match operations on 16 orthogonal LA-CDMA code simultaneously. FIG. 1 illustrates an example of LA-CDMA code groups (with 16 codes).

It will be apparent to those skilled in the art that various modifications can be made to the large area wireless CDMA method and apparatus of the instant invention without departing from the scope or spirit of the invention, and it is intended that the present invention cover modifications and variations of the large area wireless CDMA method and apparatus provided they come within the scope of the appended claims and their equivalents.

I claim:

1. A method for generation a set of Large-Area Code-Division-Multiple-Access (LA-CDMA) codes, comprising the steps of:

generating a plurality of pulses with a plurality of intervals between each of the pulses in the plurality of pulses, respectively, each pulse of the plurality of pulses having an amplitude and a polarity, with each interval of the plurality of intervals unequal to other intervals of the plurality of intervals, with only one interval of the plurality of intervals being an odd number larger than a value of a smallest interval of the plurality of intervals, without a value of any interval in the plurality of intervals being a sum of any two or more values of two or more intervals, respectively, in the plurality of intervals; and generating a plurality of codewords from the plurality of pulses, with each codeword in the plurality of codewords different from other codewords in the plurality of codewords, by assigning, for each respective codeword in the plurality of codewords, a polarity to each pulse in the plurality of pulses, wherein the plurality of codewords are any of orthogonal, bi-orthogonal and trans-orthogonal, and a cross-correlation between any two codewords in the plurality of codewords has side lobes with any of the values of zero, plus amplitude squared, and minus amplitude squared, and any codeword in the plurality of codewords has a zero correlation window in an auto-correlation function and the cross-correlation function with a magnitude equal to the amplitude squared and with a width equal to two times the smallest interval of the plurality of intervals.

2. The method as set forth in claim 1, further including the step of spread-spectrum processing each pulse in the plurality of pulses, by a pulse compression code.

3. The method as set forth in claim 1, further includes the step of spread-spectrum processing each pulse of the plurality of pulses, by a Barker sequence.

4. The method as set forth in claim 1, further includes the step of spread-spectrum processing each pulse of the plurality of pulses, by linear frequency modulation.

5. The method as set forth in claim 1, further including the step of time-offsetting and overlapping each codeword in the plurality of codewords.

6. The method as set forth in claim 5 further including the step of adopting different orthogonal modulating frequencies for different versions of the time-offset codewords in the plurality of codewords.

7. A transmitter for transmitting a spread-spectrum signal from a set of Large-Area Code-Division-Multiple-Access (LA-CDMA) codes, comprising:

transmitter-code means for generating a plurality of pulses with a plurality of intervals between each of the pulses in the plurality of pulses, respectively, each pulse of the plurality of pulses having an amplitude and a polarity, with each interval of the plurality of intervals unequal to other intervals of the plurality of intervals, with only one interval of the plurality of intervals being an odd number larger than a value of a smallest interval of the plurality of intervals, without a value of any interval in the plurality of intervals being a sum of any two or more values of two or more intervals, respectively, in the plurality of intervals;

said transmitter-code means for generating a plurality of codewords from the plurality of pulses, with each codeword in the plurality of codewords different from other codewords in the plurality of codewords, by assigning, for each respective codeword in the plurality of codewords, a polarity to each pulse in the plurality of pulses, wherein the plurality of codewords are any of orthogonal, bi-orthogonal and trans-orthogonal, and a cross-correlation between any two codewords in the plurality of codewords has side lobes with any of the values of zero, plus amplitude squared, and minus amplitude squared, and any codeword in the plurality of codewords has a zero correlation window in an auto-correlation function and the cross-correlation function with a magnitude equal to the amplitude squared and with a width equal to two times the smallest interval of the plurality of intervals;

said transmitter-code means for processing data to generate a spread-spectrum-processes signal; and transmitter means for raising the spread-spectrum-processes signal to a carrier frequency, and for transmitting the spread-spectrum-processed signal as a spread-spectrum signal using radio waves.

8. The transmitter as set forth in claim 7, with said transmitter-code means further including means for spread-spectrum processing each pulse in the plurality of pulses, by a pulse compression code.

9. The transmitter as set forth in claim 7, with said transmitter-code means further including means for spread-spectrum processing each pulse of the plurality of pulses, by a Barker sequence.

10. The transmitter as set forth in claim 7, with said transmitter-code means further including means for spread-spectrum processing each pulse of the plurality of pulses, by linear frequency modulation.

11. The transmitter as set forth in claim 7, with said transmitter-code means further including means for time-offsetting and overlapping each codeword in the plurality of codewords.

12. The transmitter as set forth in claim 11, with said transmitter-code means further including means for adopting different orthogonal modulating frequencies for different versions of the time-offset codewords in the plurality of codewords.

* * * * *